United States Patent
Redd, Jr. et al.

[11] Patent Number: 5,467,388
[45] Date of Patent: Nov. 14, 1995

[54] METHOD AND APPARATUS FOR SELECTIVELY BLOCKING INCOMING TELEPHONE CALLS

[75] Inventors: James C. Redd, Jr., Silver Spring, Md.; Von McConnell, Leawood, Kans.; Liam P. Brohan, Forks Township, Pa.

[73] Assignee: Bell Atlantic Network Services, Inc., Arlington, Va.

[21] Appl. No.: 384,636

[22] Filed: Feb. 6, 1995

Related U.S. Application Data

[63] Continuation of Ser. No. 188,871, Jan. 31, 1994, abandoned.

[51] Int. Cl.⁶ .................................................. H04M 1/70
[52] U.S. Cl. .................. 379/196; 379/67; 379/201; 379/207; 379/211; 379/221
[58] Field of Search ...................... 379/88, 89, 142, 379/189, 196, 197, 67, 201, 207, 221, 211

[56] References Cited

U.S. PATENT DOCUMENTS

| | | | |
|---|---|---|---|
| 3,786,196 | 1/1974 | Gresham | 379/189 |
| 4,277,649 | 7/1981 | Sheinbein | 379/201 |
| 4,756,020 | 7/1988 | Fodale | 379/112 |
| 4,860,347 | 8/1989 | Costello | 379/199 |
| 4,878,240 | 10/1989 | Lin et al. | 379/67 |
| 4,893,329 | 1/1990 | O'Brien | 379/88 |
| 4,896,346 | 1/1990 | Belfield et al. | 379/88 |
| 4,993,062 | 2/1991 | Dula et al. | 379/88 |
| 5,023,868 | 6/1991 | Davidson et al. | 379/142 |
| 5,029,196 | 7/1991 | Morganstein | 379/67 |
| 5,060,255 | 10/1991 | Brown | 379/67 |
| 5,109,405 | 4/1992 | Morganstein | 379/89 |
| 5,109,408 | 4/1992 | Greenspan et al. | 379/197 |
| 5,161,181 | 11/1992 | Zwick | 379/67 |
| 5,181,238 | 1/1993 | Medamana et al. | 379/95 |
| 5,208,848 | 5/1993 | Pula | 379/67 |
| 5,212,727 | 5/1993 | Ramkumar | 379/221 |
| 5,247,571 | 9/1993 | Kay et al. | 379/207 |
| 5,329,578 | 7/1994 | Brennan et al. | 379/88 |

*Primary Examiner*—Jeffery A. Hofsass
*Assistant Examiner*—Scott Wolinsky
*Attorney, Agent, or Firm*—Lowe, Price, LeBlanc & Becker

[57] ABSTRACT

A system for allowing a telephone subscriber to selectively block incoming calls for selected time periods or during programmed time intervals. A subscriber may pre-program a time interval in minutes, or a time period (start time and end time) for which some or all incoming calls are to be blocked. The subscriber may assign caller numbers or personal identification numbers to one of a plurality of tiers of access. The subscriber may enable the call blocking system for selected access tiers. An emergency access tier may be provided to insure emergency calls are not blocked by the system.

15 Claims, 11 Drawing Sheets

METHOD AND APPARATUS FOR SELECTIVELY BLOCKING INCOMING TELEPHONE CALLS

This application is a continuation of application Ser. No 08/188,871 filed Jan. 31, 1994, now abandoned.

TECHNICAL FIELD

The present invention relates to the telecommunications field, particularly to systems and apparatus for providing services to telephone subscribers.

ACRONYMS

The written description uses a large number of acronyms to refer to various services and system components. Although known, use of several of these acronyms is not strictly standardized in the art. For purposes of this discussion, acronyms therefore will be defined as follows:

Advanced Intelligent Network (AIN)
Common Channel Integrated Signaling (CCIS)
Data and Reporting System (DRS)
Integrated Service Control Point (ISCP)
Intelligent Peripheral (IP)
Integrated Services Digital Network (ISDN)
Local Access and Transport Area (LATA)
Personal Identification Number (PIN)
Private Branch Exchange (PBX)
Service Control Point (SCP)
Service Management System (SMS)
Service Switching Point (SSP)
Signaling Transfer Point (STP)
Service Provisioning and Creation Environment (SPACE)
Transaction Capabilities Applications Protocol (TCAP)

OTHER TERMINOLOGY

For the purposes of this application, the term "subscriber" is used to mean a subscriber to a telephone service and generally refers to the party being called. The term "subscriber" may encompass both business and residential telephone users. The term "caller" is used to designate a party calling the subscriber. As used in the present specification, the term "PIN" or "personal identification number" means a number which may be assigned to one or more callers. Thus, a PIN may or may not be personal.

BACKGROUND ART

The evolution of telephone and telecommunications systems has brought about an undesirable side effect— the nuisance call. A nuisance call may take one of many forms, the "sorry—wrong number" miss-dial, the persistent telemarketer, or the threatening, harassing, or obscene telephone call. Various systems, services and approaches have been taken to reduce to eliminate the number of such calls. For example, the Caller ID™ service has been used successfully to trace the source of illegal harassing or obscene calls. Further, such devices have limited ranges and may not be able to trace calls from pay phones or long distance calls. In addition, such a service does not eliminate wrong number or telemarketing calls. Thus, for most telephone subscribers, the nuisance call remains a problem.

In addition, in many instances, a non-nuisance call may be received by a subscriber at an inconvenient time. In such instances, the call itself may not be a nuisance, however, the timing of the call may be bothersome. Such inconvenience calls present an additional difficulty to the telephone subscriber.

One prior art approach to such nuisance or inconvenience calls has been to place the telephone "off-hook." Such an approach, however, may be dangerous and may present difficulties for the telephone service provider. For example, by placing the receiver off-hook, the telephone cannot receive any outside calls, even emergency calls (fire, ambulance, police, or the like). Further, the telephone, when placed off hook, may generate an annoying buzzing noise, usually followed by a recorded announcement. This noise and announcement are usually generated by the telephone service provider to encourage the telephone user to leave the handset on-hook, as an off-hook handset may unnecessarily tie up telephone switching equipment. For this reason, a receiver which is off-hook may be disconnected from the switching point of a telephone system after the receiver has been off-hook for a predetermined amount of time. In some systems, the receiver may not be reconnected immediately after being placed on-hook, and thus the telephone is unavailable to the subscriber for a period of time after being placed on-hook. As a result, calls cannot be made during this time period, a potentially disastrous situation in an emergency situation where the telephone is needed (e.g., fire or medical emergency).

In addition, placing the receiver "off-hook" serves to shut off the telephone receiver, blocking all incoming calls. To overcome this difficulty, some subscribers have resorted to commercially available telephone answering machines to provide call screening. An answering machine is generally provided with a speaker, allowing the subscriber to hear the voice of the caller. The subscriber can then selectively pick up the receiver and talk to the caller once the caller has been identified. This approach has several disadvantages. All calls, including nuisance calls will ring the subscriber's phone, interrupting the subscriber's peace and quiet. Further, the subscriber must still visit the phone (or in this case, answering machine) and listen to the voice of the caller and determined whether or not to take the call, and thus manually screen the calls.

In addition to the foregoing, the caller, upon hearing the answering machine recording, may believe that the subscriber is not home and thus hang up. If the subscriber does decide to take the call, the speaker on the answering machine may produce unwanted feedback with the microphone on the receiver, and thus the subscriber must hurriedly turn down the volume on the answering machine before answering, a difficulty if the receiver and answering machine are in adjacent rooms. Some answering machines will continue to record the conversation, even after the subscriber picks up the receiver. These recordings may run out the answering machine tape, preventing reception of further calls, or force the subscriber to rewind the tape after each call.

Brown U.S. Pat. No. 5,060,255, issued Oct. 22, 1991, and incorporated herein by reference discloses a timed-do-not-disturb service. A system processor is responsive to subscriber identification and stored class of service information to recognize that timed-do-not-disturb service is to be provided to an identified subscriber station. The processor determines the identity of the subscriber station which is to receive the requested service and the time of the service and generates a programming signal and formats the signal for compatibility with the switch to which the station is connected.

While such a system effectively serves to block calls for a predetermined period of time, the system does not allow for emergency calls or selected calls to be passed through.

O'Brien U.S. Pat. No. 4,893,329, issued Jan. 9, 1990 and incorporated herein by reference discloses a telephone call deferral system which allows incoming telephone calls to be deferred for a user selected period or until a user selected time. During the defer time, incoming calls are intercepted, the ring sound is suppressed, and the caller receives a voice message indicating that calls are not currently being received but will be taken at the specified defer time. Programming of the defer mode is effected from the key pad of any telephone instrument connected with the telephone line of the user. An override system allows emergency calls to be completed from parties in possession of a special access code.

One difficulty of such a system is that the entire call deferral process may be easily defeated if the special access code is compromised. For example, if a special access code is provided to emergency personnel (Police, Fire Department, Hospital, or the like), it is foreseeable that the access code may eventually be disclosed to unauthorized users. In addition, the system of O'Brien provides only for one level of caller access— emergency access. Thus, a subscriber cannot selectively screen telephone calls to receive calls from selected individuals.

Services such as Caller ID™ have been used with some success by subscribers to manually screen incoming calls. However, the subscriber must be able to recognize and correlate the incoming number with the name or identity of the caller in order to effectively screen the call. Further, if a known caller calls from a different number, the subscriber will not recognize the caller from the number displayed by the Caller ID™ system. In addition, as discussed above, long distance calls or calls from pay phones may not display a Caller ID™ number of the subscriber's display. Even in situations where the number is displayed, the subscriber must still manually screen the calls by viewing the Caller ID™ display, and thus must still run for the phone when a incoming call is received. Finally, such a system does not effectively distinguish emergency calls from ordinary calls. Thus, a subscriber may inadvertently screen out an important emergency call if the number on the Caller ID™ screen is not recognized.

One prior art apparatus which attempts to overcome this problem is described in Morganstein U.S. Pat. No. 5,029,196, issued Jul. 2, 1991 and incorporated herein by reference. Morganstein discloses a user programmable telecommunications system for a PBX that allows a called party to pre-program alternate destinations for incoming calls within the PBX. Incoming calls are appraised by the caller's number and may be selectively routed to a voice store and forward facility so that a verbal message can be deposited by the calling party. The user-programmer can designate one or more of a list of incoming telephone numbers as important. Incoming calls from these numbers will be directly routed by the system to the user. The system may then announce the name of the calling party to the user.

This system suffers from several drawbacks. Thus the system only allows users from particular calling numbers to have call-through access to the subscriber. Thus, if a call by an "important" caller is made from a different number, the caller will not get through, even if the subscriber wished to receive that call. In addition, other callers from the same number (e.g., relative, co-worker or the like), whose calls may not be desired by the subscriber will have call-through access by virtue of calling from the same number.

The system of the Morganstein patent provides two or three levels of access (important, intermediate, and other) and makes no provision for the acceptance of emergency calls as the system is directed towards business applications (i.e., PBX or the like). The patent describes rerouting calls to a "secretary, switchboard attendant or colleague" (column 12, lines 21–22) who presumably could determine whether a call was emergency in nature or from a desired caller. As such, such a system is not readily adaptable for home use, as most individuals do not have such personnel to manually monitor their incoming calls. Further, even for business applications, the system does little to reduce the need for manual call screening by secretaries, switchboard attendants or colleagues, and thus adversely affecting productivity of a business.

The system of the Morganstein patent is too unwieldy for the average subscriber to program. In order to designate a number as important or intermediate, the subscriber must program that caller's number manually and assign that number a destination (voice message or user). Thus, it is difficult for a subscriber to change the destination of individual numbers for short periods of time or change the level of access for large numbers of calling numbers.

Thus, it remains a requirement in the art to provide a usable system for allowing a subscriber to screen out nuisance or inconvenience calls, while still allowing the subscriber full access to the telephone for desired incoming calls, emergency calls, and outgoing calls.

DISCLOSURE OF THE INVENTION

A system for limiting access in a telecommunications system comprises a database for storing at least one number indicating one or more authorized callers. An access control means intercepts each incoming call and querying the database. A comparing means compares the caller number with the at least one number stored in said database and selectively enables the call if the caller number is authorized in the database.

It is an object of the present invention to allow access to a subscriber for calls origination from specific predetermined numbers.

It is a further object of the present invention to allow access to a subscriber for callers in possession of a predetermined PIN.

It is one object of the present invention to provide a system for selectively screening calls which may be programmed to selectively screen calls for a predetermined period of time.

It is another object of the present invention to provide a system for selectively screening calls which may be programmed to selectively screen calls between predetermined times of day.

It is a further object of the present invention to provide a system for selectively enabling calls between predetermined times of day for predetermined days of the week.

It is another object of the present invention to provide selected numbers of access levels to allow a user to selectively screen calls from one or more access levels.

It is a further object of the present invention to provide multiple levels of encryption for access codes to allow enhance the security of a timed-do-not-disturb system.

It is yet a further object of the present invention to enhance the security of access codes by correlating access codes with the calling party's calling number.

It is a further object of the present invention to provide some or all of the above objects in simple cost-effective manner.

BEST MODE FOR CARRYING OUT THE INVENTION

Figure 1:
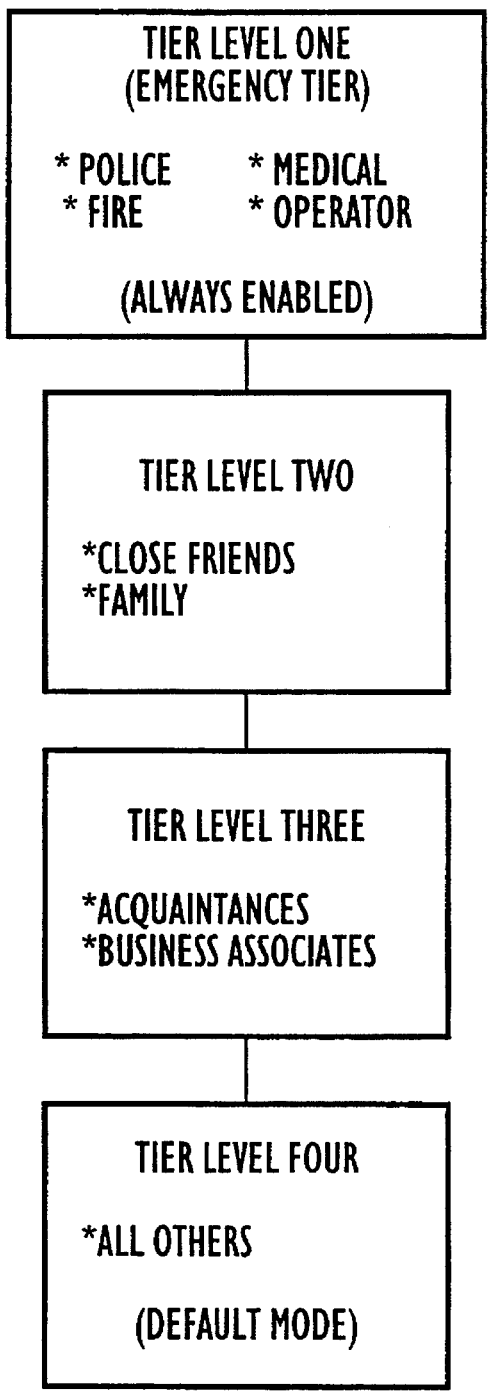
FIG. 1 shows the relationship between various tiers or access levels in the present invention.

The present invention provides an improved version of the "Call Block" (also known as "Timed-Do-Not-Disturb") service disclosed in Brown U.S. Pat. No. 5,060,255, issued Oct. 22, 1991, and incorporated herein by reference. Standard Call Block enables a subscriber to designate time periods during which no incoming calls are to be received over the subscriber line. Any calls dialed to the subscriber directory number at such times are diverted to a voice response unit that issues an appropriate announcement to inform the caller of the unavailability of the dialed number station. The present invention allows for more customizing enabled by the flexible and more economical Advanced Intelligent Network (AIN) environment.

SERVICES PROVIDED

In the present invention, A subscriber may designate, through DTMF input, time periods during which incoming calls are to be selectively blocked to one or more subscriber stations. Incoming calls dialed to the subscriber during designated periods instead will be routed to an announcement. The announcement received by a caller may be a standardized message, stating that the called party has requested no interruptions and indicating when calls will be received. Alternatively, a customized message may be provided to advise of the availability of additional options; for example, the caller may be given the option of directing the call to the subscribers voice mail box.

The service may be activated or deactivated by a call from the subscriber to a system number, which may be a virtual number, followed by appropriate identification procedure. Each time the service is activated, the subscriber may select a time period (in hours and minutes) or range of times (start times and end times) in which selective call blocking will be in effect, which will then be set forth in the announcement. The subscriber may program a reminder call to the subscriber with an appropriate announcement at the start and end of the activated call blocking periods.

During an activated call blocking period, outgoing calls will be unaffected and selected calls and emergency calls will be admitted. At the end of such a period, normal telephone service operation will be restored automatically. The subscriber may enable selected callers access while blocking calls from other callers. During the activation selection process, the subscriber may choose one or more PINs, caller numbers or tiers of access, each permitting call availability in accordance with a schedule determined by the subscriber.

For example, a subscriber may wish not be disturbed except by emergency calls. Such calls may comprise, for example, calls from Police, Fire Department, hospital, or from a telephone operator. The system may be configured such that these calls are on a highest tier level of access. Thus, for obvious safety reasons, the system may be configured such that the subscriber can never block such calls. In the preferred embodiment, the system is configured such that emergency calls may never be blocked.

In the initial preferred embodiment, it may be desirable to place the telephone operator on the first tier level of access, as it may be difficult to initially provide caller access to all emergency numbers. In addition, other emergency calls may be made from callers not on an emergency list. An emergency caller may contact the telephone operator, and, after identifying himself and the nature of the emergency, may request that the operator access the subscriber's number. Alternately, the caller may be connected to the operator (or a special operator) by entering a predetermined DTMF input (e.g., "0") in response to a recorded message played when selective call blocking has been enabled. Of course, since the subscriber may selectively program the service, the subscriber may provide emergency access to selected callers, such as a commercial alarm company (e.g., ADT™ or the like).

These emergency numbers may be provided to access the subscriber's station by use of a Caller ID™ or Automatic Number Information (ANI) system, by a PIN, or by a combination of both. The telephone service provider may provide a database containing the caller numbers of all Police, Fire, and medical emergency officials. When a call is made from one of these numbers, the system of the present invention recognizes the call as being from one of the numbers on the emergency database list and allows direct access to the call to the subscriber's telephone.

By providing a centralized database of such numbers, the telephone service provider may readily and easily update such a list if the caller numbers are changed or added to (e.g., new fire station or the like). Further, the system may be provided to allow these numbers to call through without first passing through the selective call block system, thus saving additional time in an emergency.

The subscriber may also designate a series of PINs which allow access to the subscriber's telephone. These PINs may be provided in tiers, such that the caller may select which level of access each caller may have and select which level of access should be provided at any given time. For example, the subscriber may wish to have close friends and family to have a high level of access, while others may have a lower level of access.

This tiering technique may be accomplished in a number of ways. For example, unique PINs may be assigned to each potential caller by the subscriber. The subscriber may then assign a tiering level to each caller's PIN. The PIN may be assigned as a unique number or may be the caller's own phone number, the latter of which may be easier to remember. In other words the PIN may be customized to be any number desired by the subscriber.

When the subscriber wishes not to be disturbed, the subscriber selects a tier level when enabling the call block service. Callers whose PINs are tiered at or above that level may have access to the subscriber's telephone. Callers without PINs or whose PIN is below the tier level selected by the subscriber, receive a recorded announcement and may be redirected to a voice mail system or the like. As various callers fall in and out of favor with tile subscriber, the subscriber may adjust the tier level of each caller's PIN.

FIG. 1 shows an example of this tiering scheme showing four tier levels. As discussed above, the highest tiering level comprises emergency callers such as police, fire or the like. In the preferred embodiment, this level is always activated such that the subscriber cannot block these calls. Of course, the system may be provided to allow for blocking of all calls without departing from the spirit and scope of the invention. The second tier level may comprise those callers such as close friends or family members. If this level is selected by the subscriber when enabling the call block system, only calls from individuals on this tier or the highest tier (emergency) are allowed access to the subscribers telephone. The third tier level may comprise acquaintances or other persons known to the subscriber whose calls the subscriber may wish to occasionally block. The subscriber may select this tier level if he or she wishes to receive calls only from known callers. The last and bottom tier level comprises all other callers. This last tier level is essentially the default mode when the call block system is not enabled, although a recorded announcement may be provided at this level as well.

For example, the subscriber may provide an announcement requesting that commercial callers (e.g., telemarketers or the like) leave a message with a voice mail system, whereas all others may ring through by pressing the "*" key or the like. Legal sanctions may be enacted to enforce such a request. Of course other numbers of tiers than those shown in FIG. 1 may be used without departing from the spirit or scope of the invention. In addition, when enabling the Call Block system, the subscriber may manually enter PINs (or caller numbers) for callers he wishes to allow temporary access. These manually entered numbers may temporarily modify the tier list or supplant it. Thus, for example, if a subscriber is expecting an important call from one individual, the subscriber can configure the selective Call Block such that only that call will get through (in addition to emergency calls, as discussed above).

It should also be noted that the subscriber may elect to share one PIN with a number of potential callers. For example, for those persons on the third tier level of access, the subscriber may assign only one PIN. Those persons on the second tier level of access may be assigned a different PIN (or numbers). Thus, the subscriber may move a caller from one tier level to another by telling the caller the PIN for tier level two. Alternately, the caller may elect to assign PINs to groups of individuals. For example, the subscriber may assign one PIN to a group comprising co-workers. The subscriber may then selectively change the level of access to this entire group at once by moving this PIN from tier level two to tier level three or vice versa. Since the system recognizes only PIN or caller numbers and designated tier levels of access the subscriber may elect any one or all of these access strategies.

The tiering technique may be used with PINs as discussed above, or by the use of the caller's number as provide by an ANI or Caller ID™ system. The system may be configured to ring through directly those calls determined (via Caller ID™ or the like) to be on an enabled tier. As discussed in the background of the invention, the disadvantage of using the caller's number to provide access is that a caller whose call is desired may be calling from a different station. Thus, the caller may provide his PIN (which may be his standard station number) in response to the recorded announcement received by unauthorized callers.

In order to prevent or reduce the incidence of compromise of PINs, the PIN code may be encrypted in one of several ways. First, a PIN may be provided which correlates to a unique caller number. Thus, the PIN will only be enabled if the caller is calling from that number. Alternately, the PIN may be augmented with a daily or monthly key which may be required for access. Such an arrangement may be particularly useful for the emergency tier level of access. For example, in an alternative embodiment, one PIN may to be assigned to emergency services (e.g., Fire, Police, Alarm Company, or the like). If that PIN were inadvertently made public, callers could readily defeat a selective call blocking system by using such a PIN. Thus, the system of the present invention may be programmed such an emergency PIN be recognized only when calling from a particular number. A similar technique may be used if a subscriber wishes to receive calls from an individual at a specific number, but not from other members of that household, The subscriber may require both the correct PIN and Caller ID™ number in order to get through. Of course, other security methods may be employed which are within the scope of the present invention. For example, a monthly key number may be used in combination with the PIN in order to prevent emergency PINs from being used by the public if inadvertently disclosed. In addition, emergency PINs may be changed or rotated on a periodic basis.

Although FIG. 1 shows the use of four tier levels, in the preferred embodiment, as presently envisioned, only one or two access levels are provided. Thus, in the preferred embodiment, the emergency tier is provided, which is always enabled, and may not be altered or disabled by the subscriber. The system enables emergency calls by comparing the caller number (or tag, as discussed below) with numbers provided in a database. Tier level two is provided in which the subscriber may maintain any number of PINs to selectively enable callers. The subscriber may selectively enable or disable tier level two and may add or delete PIN numbers from this tier. Although at the present time the two tier strategy is the preferred embodiment, it is envisioned that in the near future, the preferred embodiment of the present invention may comprise the multi-tier embodiment shown in FIG. 1.

The selected call blocking system discussed above has been described in terms of selectively accepting calls from designated users. In an alternative embodiment, known as Call Denial, may be enabled in conjunction with or separately from the first embodiment described above. Call Denial allows a subscriber to selectively block all calls from a particular number or exchange. Rather that selectively accept a call based upon the caller's Caller ID™ or AIN number, the subscriber may program the system of the present invention to always block calls from that caller's number. Thus, all incoming calls from a particular number or exchange may be routed to a prerecorded announcement or voice mail system.

AIN HARDWARE

Figure 2:
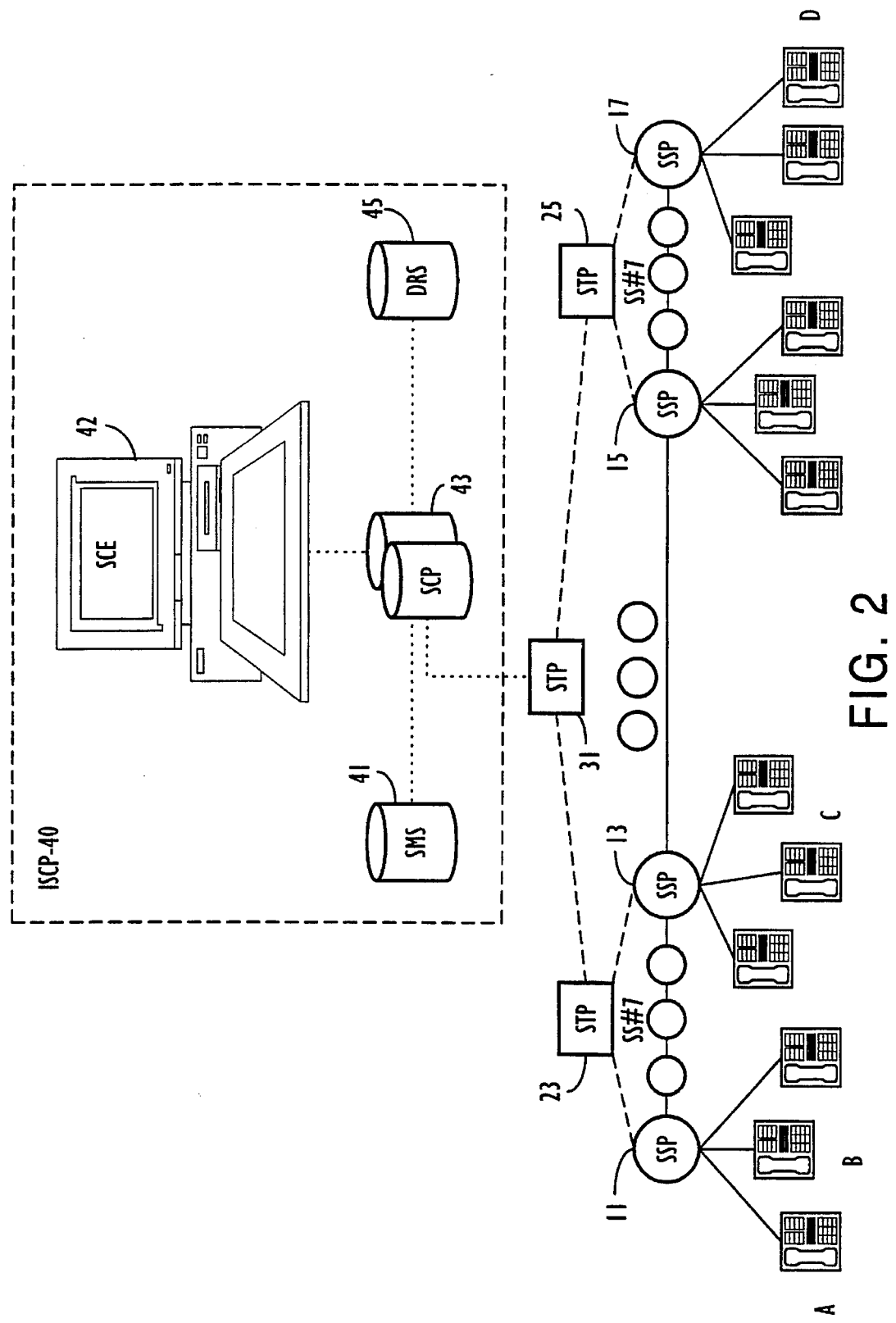
FIG. 2 is a block diagram of one embodiment of the selective call blocking system of the present invention.

The above described features of the present invention are economically provided in an AIN network environment illustrated in FIG. 2. FIG. 2 is a schematic block diagram of the components of AIN showing detail of the preferred embodiment of the system for implementing the invention. Service Switching Points 11, 13, 15 and 17, referred to as SSP's, are appropriately equipped programmable switches present in the telephone network, which recognize AIN type calls, launch queries to the ISCP and receive commands and data from the ISCP to further process AIN calls. FIG. 2 shows a telephone receiver A representing the telephone of a caller. Telephone D represents the telephone for a subscriber provided with the selective call blocking feature of the present invention. Each of the SSP type central offices may be at a different location and may be distributed throughout the area, region or country.

SSP's can be programmed to recognize a number of different triggers as an indication that a call is an AIN call. As the base line function is the ability to turn off and on an incoming call, the AIN trigger is a Terminating Attempt Trigger (TAT) active at the terminating switch 17 of the call. SSP 17 then trigger AIN type servicing based on the TAT.

As shown in FIG. 2, elements 11, 13, 15 and 17 are SSP's. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSP's.

SSPs 11 and 13 connect to a first local area STP 23, and SSPs 15 and 17 connect to a second local area STP 25. The connections from SSPs to STPs shown in dotted lines are for signalling purposes. As indicated by the black dots below STPs 23 and 25, each local area STP can connect to a large number of the SSPs. Although not shown in FIG. 2, the central offices or SSPs may be interconnected to each other by trunk circuits for carrying telephone services.

Local area STPs 23 and 25, and any number of other such local area STPs shown as black dots between STPs 23 and 25 may communicate with a state or regional STP 31. State or regional STP 31 in turn provides communications with ISCP 40. The STP hierarchy can be expanded or contracted to as many levels as needed to serve any size area and to service any number of stations and central office switches. Links 23 and 25 between COs and local area STPs are dedicated CCIS links, typically SS#7 type interoffice data communication channels. Local area STPs are in turn connected to each other and to regional STP 31 via a packet switched network. Regional STP 31 also communicates with ISCP 40 via a packet switched network.

The messages transmitted between SSPs 11, 13, 15 and 17 and ISCP 40 are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from the SSP may include, among other data, a "Service Key" which comprises the calling party's address and digits representing the called party (i.e., subscriber's) address. The TCAP specifies a number of additional message formats, for example a format for a subsequent query from the SSP, and formats for "INVOKE" responses for instructing the SSP to play an announcement or to play an announcement and collect digits.

As shown in FIG. 2, ISCP 40 may comprise an integrated system. Among other system components, ISCP 40 includes a Service Management System (SMS) 41, a Data and Reporting System (DRS) 45 and the actual database or Service Control Point (SCP) 43. ISCP 40 also typically includes a terminal subsystem referred to as a Service Provisioning and Creation Environment or SPACE (not shown) for programming the database in SCP 43 for the services subscribed to by each customer.

Each central office switching system normally responds to a service request on a local communication line connected thereto to selectively connect the requesting line to another selected local communication line. The connection can be made locally through only the connected central office switching system. For example, for a call from station A to station B, SSP 11 provides the call connection without any connection to another central office. When the called line connects to a distant station, for example when station A calls station D, the connection is made through the connected central office switching system SSP 11 and at least one other central office switching system SSP 17 through the telephone trunks interconnecting the two CO's.

When a caller at station A attempts to call a subscriber at station D when selective call blocking has been enabled, the call is routed in the usual fashion from caller A, through SSP 11 and interconnecting trunk lines to SSP 17. SSP 17, through its internal translation tables, recognizes from the service key that the subscriber's number being called has been activated with the selective call block feature, suspends the incoming call from caller A, generates a Terminating Attempt Trigger (TAT), and requires a TCAP query message to be sent to ISCP 40 prior to further call processing. Interchange of messages between SSP 17 and ISCP 40 determines the functions (e.g., announcement, acceptance of PIN information, call placement) that the switch will perform. In the preferred embodiment, discussed below in connection with FIG. 4, these functions may be performed in whole or in part by an intelligent peripheral (IP).

ISCP 40 may then instruct SSP 17 to play a prerecorded announcement which may be stored at SSP 17, and receive a string of digits input from caller A in DTMF format. The recording may be a standard recording provided by SSP 17 which may announce:

"The number you have reached is unavailable to take your call. Please enter your PIN after the tone, or stay on the line to leave a message."

Of course, other types of announcements may be used without departing from the spirit or scope of the invention.

SSP 17 may then receive a string of DTMF digits comprising the caller's entered PIN (in the preferred embodiment, 4 digits) or note the absence of digits. These DTMF digits (or absence thereof) may then be transmitted to ISCP 40. ISCP 40 compares the received PIN to those numbers stored in the subscriber's authorized tier levels stored in database 43. If the PIN entered by the caller matches an authorized PIN stored in database 43, ISCP 40 instructs SSP 17 to connect the call. If the PIN entered by the caller does not match an authorized PIN, or, if no PIN is entered, ISCP 40 instructs SSP 17 to connect caller A to a voice message system (if available) or disconnect the call.

In a similar manner, ISCP 40 may instruct SSP 17 to connect caller A after comparing the caller's number from the service key to a list of authorized numbers in database 43. If the caller's number matches an authorized number in database 43, ISCP 40 may instruct SSP 17 to connect caller A to subscriber D. Since the PINs in the preferred embodiment are four digits long, the PINs may be the same number as each caller's number. Thus, is a caller calls from his "home" phone, and is authorized by the subscriber, the caller will be connected directly, without having to enter a PIN of listen to the recorded announcement. If the same caller calls from another phone (office phone, pay phone or the like), he may receive the recorded announcement and enter his PIN (in this instance, the last four digits of his home phone number) and be routed to the subscriber accordingly.

In one alternative embodiment, ISCP 40 may receive the caller's number from the service key and also require a different, corresponding PIN from the caller before access is allowed (presuming, of course, that the subscriber has activated the caller's level of access).

In another alternative embodiment, SSP 17 may be programmed to recognize the calling parties number from the TCAF query and selectively allow the call to go through to subscriber telephone D if the caller's number has been enabled by the subscriber as discussed above. In the preferred embodiment, it has been determined to be more economical to provide most processing services within the AIN environment, as providing such a service as the SSP requires programming a numerous individual SSPs 11, 13, 15 and 17. Thus, in the preferred embodiment, SSP 17 generates a TAT and requests further instructions from ISCP 40 through STPs 25 and 31.

Of course, such processing may be made both at SSP and in the AIN environment. For example, in the preferred embodiment, since so-called "emergency" numbers, (described above) may not change often, it may be possible to program all of SSPs 11, 12, 15 and 17 to recognize these emergency numbers and provide direct call routing, bypassing the call blocking feature (and TAT) and AIN entirely. In addition, the Service Key may be modified to 'tag' such emergency calls with an identifier recognized by SSPs 11, 13, 15, and 17 such that the emergency nature of the call will be recognized by the SSPs and routed accordingly, regardless of the caller's number. This latter approach may be much easier to implement, as the programmed emergency numbers need not be selected and programmed for each SSP 11, 13, 15, and 17, and further allows for emergency calls to be made from other numbers. Such a 'tag' may be generated at the caller's SSP 11 if SSP 11 is programmed (by the telephone service provider) to provide such a 'tag'. Further, such a 'tag' may also be recognized by ISCP 40 to route emergency calls to subscriber D.

PROGRAMMING

The subscriber may program his selective call blocking service from any telephone by dialing a virtual number. The term "programming" is used here to describe the steps of activating and deactivating the selective call blocking feature and to enable ancillary features, and to build and maintain the caller access tier database. The subscriber may enter information into ISCP 40 by a subscriber's use of DTMF input after calling a dialed line number (DLN). This DLN may be a virtual number representing a line to which there is no attached subscriber equipment. The switch to which this call is directed, through its translation tables, recognizes that a query message to the ISCP is required. Through appropriate exchange of messages, under the control of the ISCP, information required for the subscriber's CPR is obtained. These functions may also be performed through an intelligent peripheral (IP), an additional network element, as will be discussed below in connection with FIG. 5.

The steps in programming the selective call block feature are shown in the flow chart in FIGS. 3A–G. As discussed below, this feature may also be implemented in an intelligent network, or as part of another telephone service feature such as voice messaging or the like. A subscriber may customize his selective call block feature by selecting from one of a number of menu items over the telephone. Such menu driven DTMF response systems are well known in the art for use in voice messaging, banking and call routing systems and are not shown here in detail. For the sake of simplicity, not all steps in the menu flowcharts of FIGS. 3A–G have been shown. For example, it may be necessary at DTMF input steps to provide "fail safe" subroutines to prevent a subscriber from entering a number out of range, or to prompt the subscriber if more than one key is pressed at one time. Similarly, global commands (e.g., the "#" key or the like) may be implemented allowing the subscriber to exit any menu at any time.

Figure 3A:
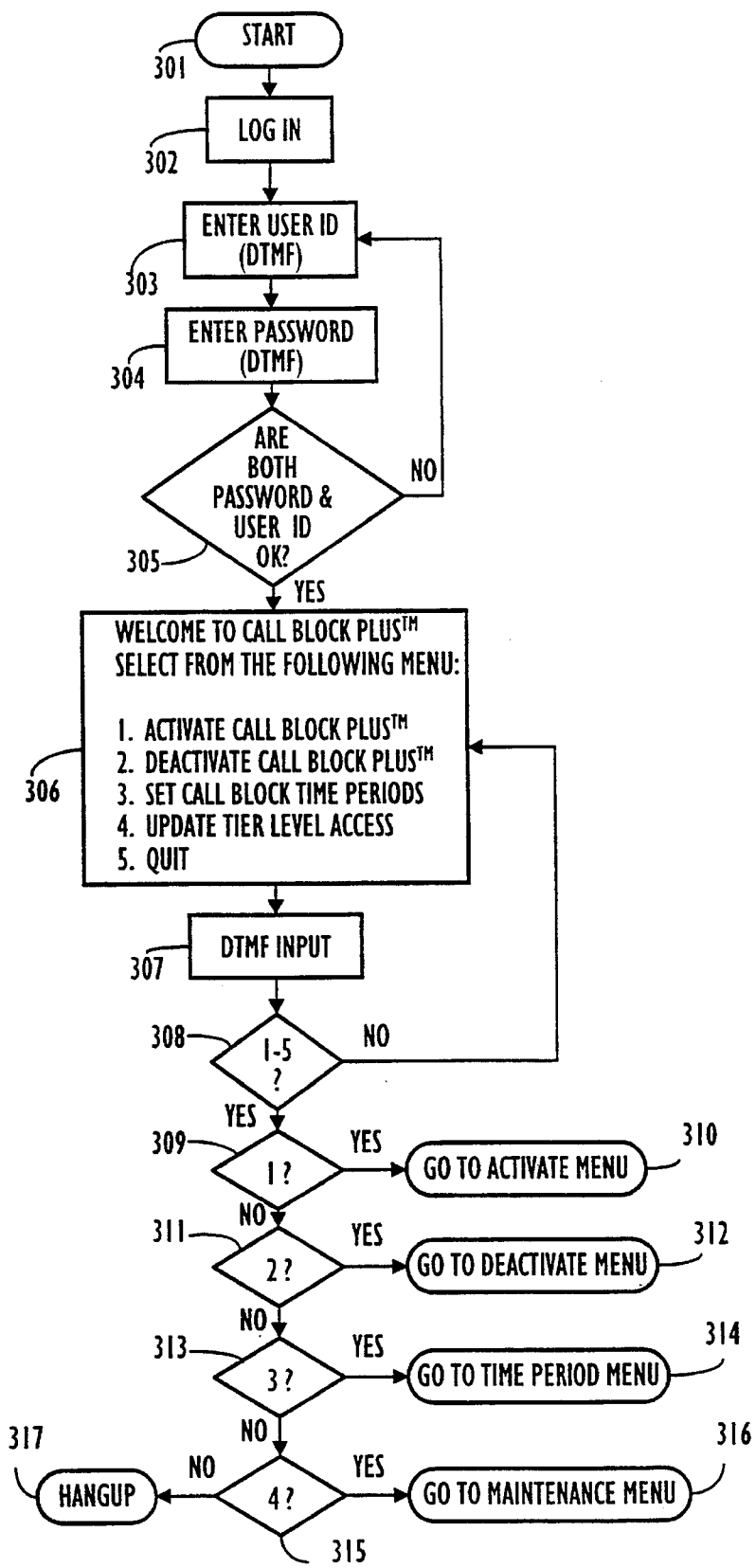
FIG. 3A is a flowchart of the first menu level for the user interface.

FIG. 3A shows the main or first menu level available to the subscriber. The subscriber may accesses this menu at step 301 by dialing a number which may be a virtual number in the telephone system. The hardware for the voice response menu system may be provided at the switch, at ISCP 40, or in an intelligent peripheral or other network device. To prevent unauthorized users, (e.g., pranksters, hackers or the like) from altering the status of a subscriber's selective call blocking system a user ID and password system may be used at steps 302–305. For the sake of simplicity, the user ID may comprise the last four digits of the subscriber's phone number. The password may be a four digit number of the subscriber's choosing.

The subscriber may access the system as shown in steps 301–304 through his own telephone, or by remote access. Since the number called by the subscriber to access the system may be a virtual number, the subscriber may access the system from nearly any telephone in the world. In the preferred embodiment, however, DTMF input is used, and hence the subscriber must have access to a Touch-Tone™ telephone.

Once the user has logged into the system by entering the correct number and password, the subscriber may select from a menu of items at step 306 offering options how to program the service. In FIGS. 3A–3G, the blocks showing words in quotations indicate verbal messages generated by the system to be played for the subscriber. When the subscriber enters a selection number via DTMF input 307, the subscriber is routed to another level of menus via decision gates as shown in blocks 308–317.

Figure 3B:
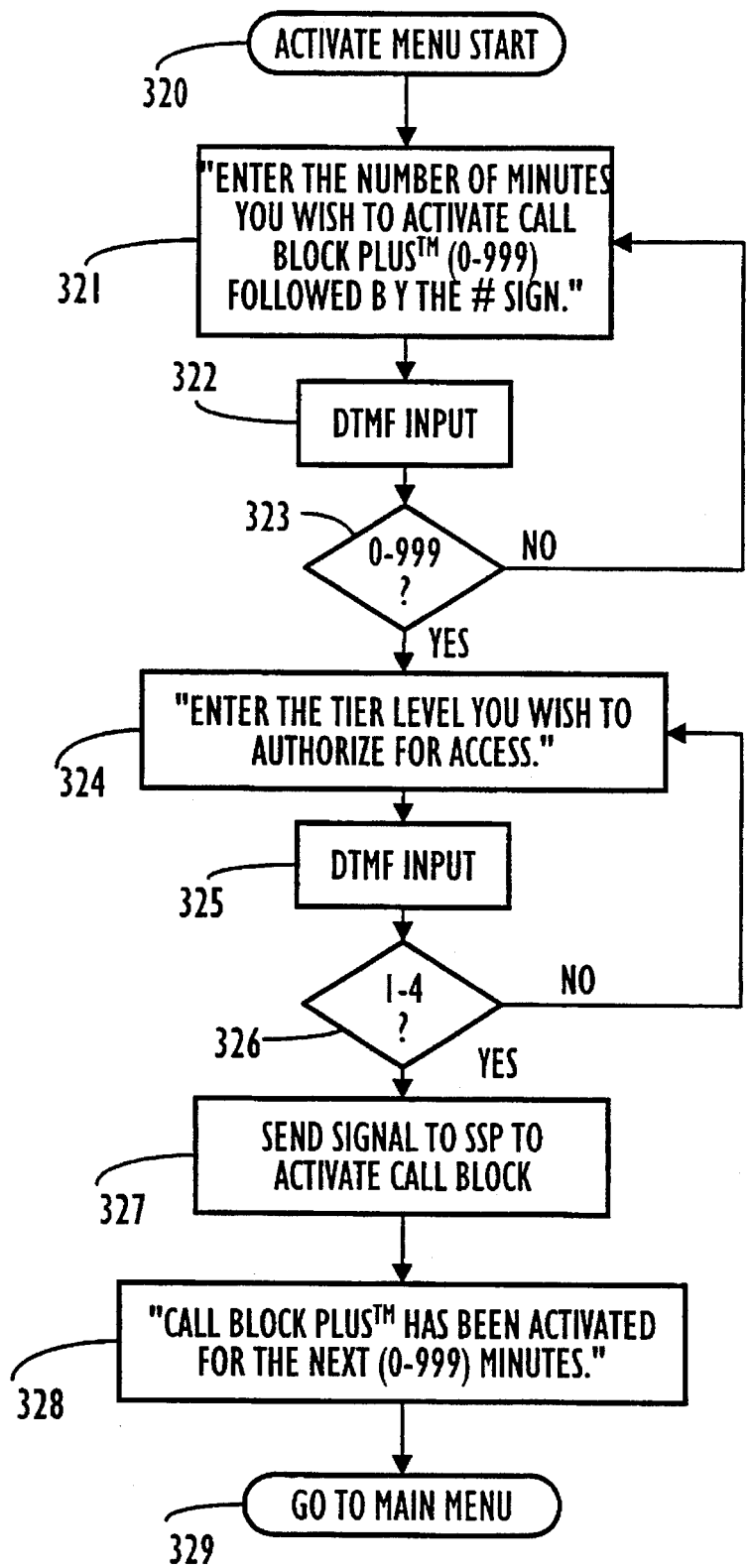
FIG. 3B is a flowchart of the second menu level for the user interface.

From the menu, the subscriber may elect to activate selective call blocking (1) for a selected period of time. FIG. 3B shows menu level two, which is activated at step 320, for implementing selective call blocking. At prompt 321, the subscriber enters a number at DTMF input step 322, (which may be in minutes 0–999) for which he does not wish to be disturbed. Decision gate 323 may be provided to insure that the number entered is within a predetermined range. The range of 0–999 is shown for purposes of illustration only, and other ranges may also be used without departing from the spirit or scope of the invention. Further, to make programming simpler for the subscriber, an input system of hours, or hours and minutes may be used in place of (or accompanying) the minutes input system.

In step 324, the system may then prompt the subscriber for the tier level of selective call blocking desired, such as one of the levels shown in FIG. 1. When selective call blocking is enabled, only calls from the selected tier or above will be allowed to call through to the subscriber's telephone receiver. The subscriber then enters the desired level via DTMF input 325, which may be range verified by decision gate 326.

Once the time limit and tier level have been selected by the subscriber, a signal is sent in step 327 to the SSP to activate the selective call blocking service. A verbal message in step 328 may confirm the subscriber's selection and processing may be returned to the main menu at step 329.

Figure 3C:
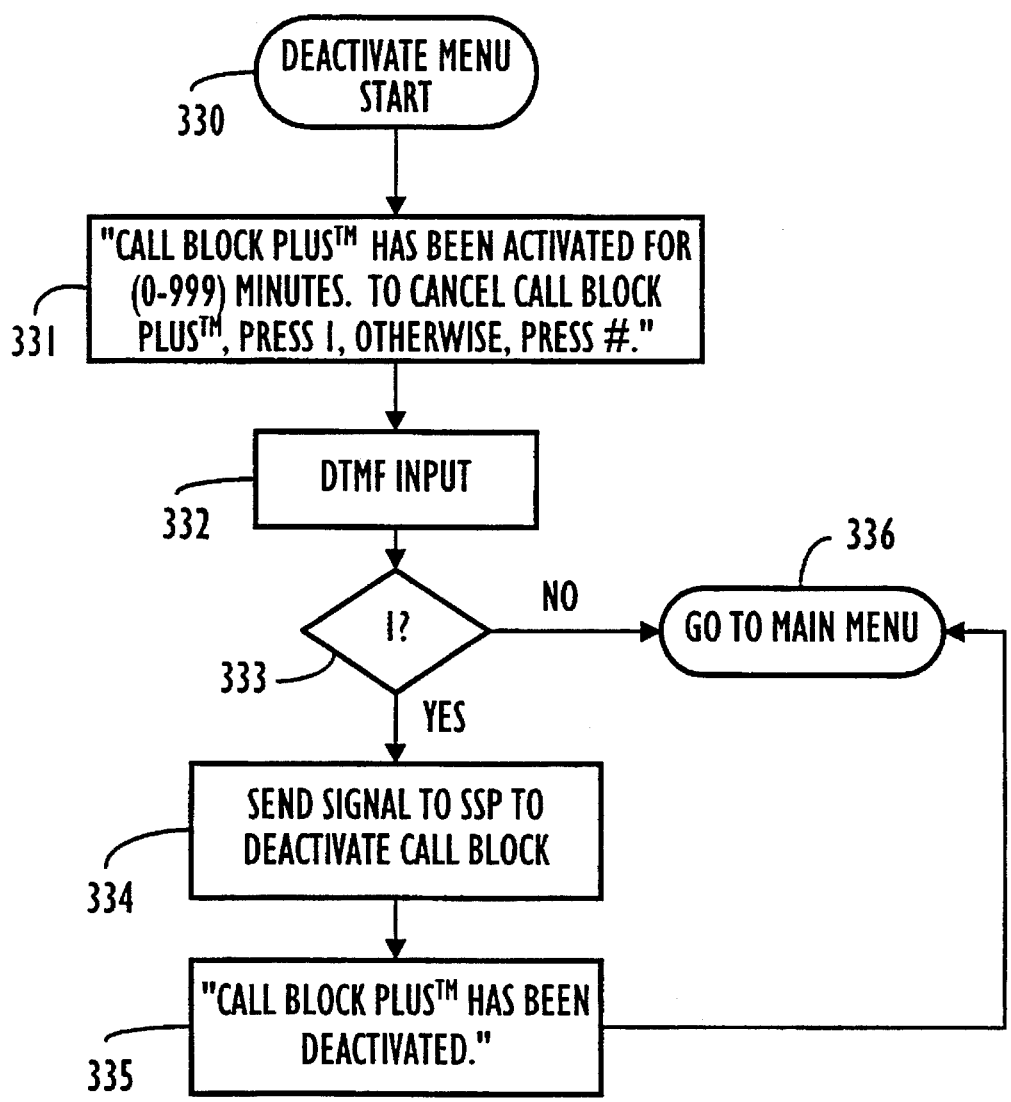
FIG. 3C is a flowchart of the third menu level for the user interface.

FIG. 3C shows menu level three (selection 2 from the menu level one), which is activated at step 320, for deactivating the selective call blocking service. Processing is branched to step 330 from menu level one in FIG. 3A. A verbal prompt is given to the subscriber at step 331 indicating the time remaining for which the selective call block service has been activated. If the call block service has not been activated, the verbal prompt may state "zero minutes" or give a different message such as "Selective call blocking has not been activated" and return-to the main menu. The subscriber may then confirm, via DTMF input step 332 and decision gate 333 his desire to deactivate the selective call blocking feature. If the subscriber enters a "1" on the touch tone keypad, a signal will be sent at step 334 to the SSP to disable the call blocking service. A verbal confirmation message may then be provided at step 335 and processing returns to the main menu at step 336.

Figure 3D:
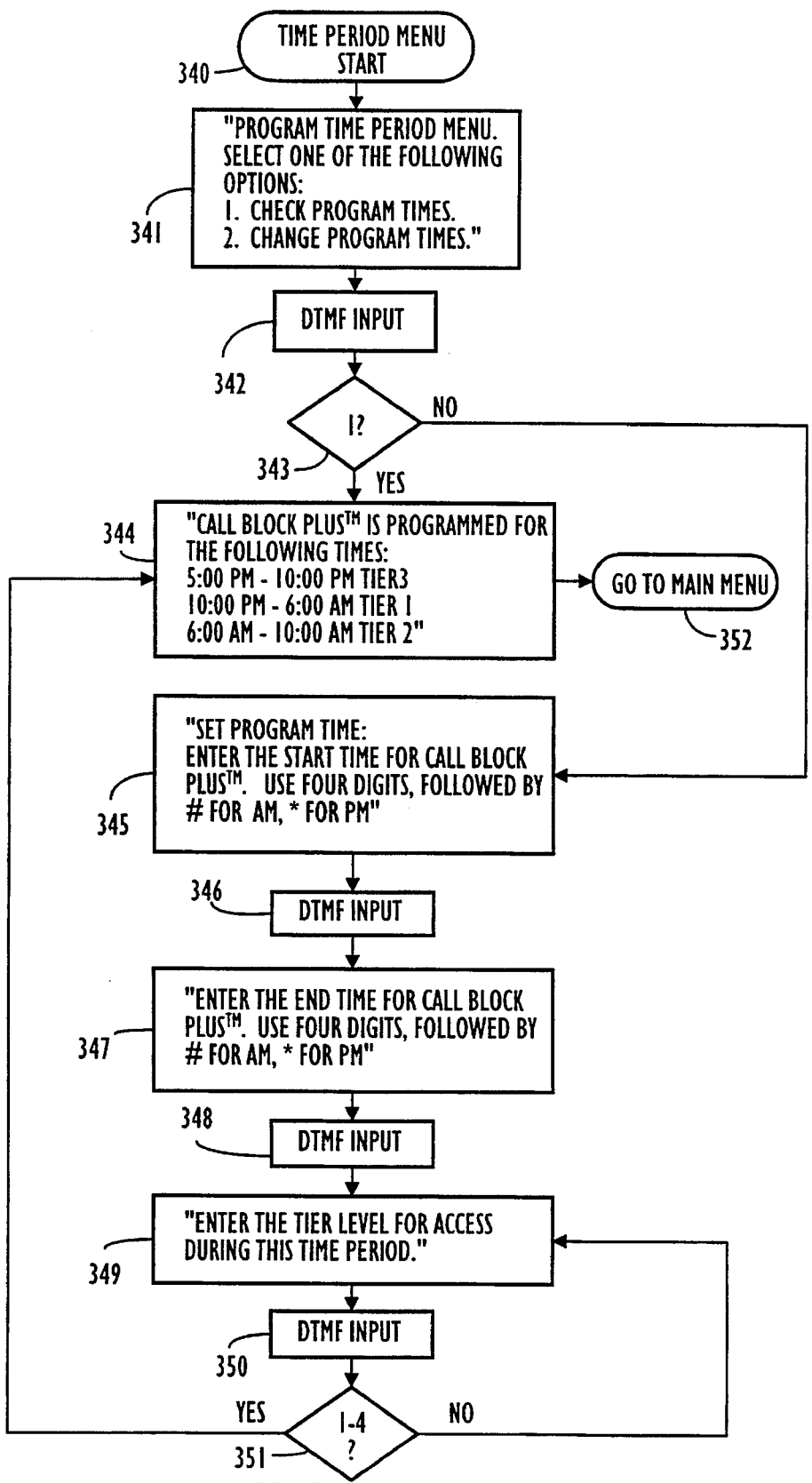
FIG. 3D is a flowchart of the fourth menu level for the user interface.

Menu level one, selection (3) allows the user to select certain times of day to automatically enable selective call blocking. FIG. 3D shows menu level four, activated at step 340, for selecting and enabling this preprogrammed time period. In the Example of FIG. 3D, the subscriber may wish to create three time windows for which selective call blocking is enabled. For example, from 5:00 PM to 10:00 PM, a subscriber may wish to enable tier 3, to allow calls from friends, family and acquaintances, as well as emergency calls, while blocking out telemarketers. From 10:00 PM to 6:00 AM, the subscriber may wish not to be disturbed except by tier 1 emergency calls. In the early morning hours of 6:00 AM to 10:00 AM the subscriber may wish to select tier 2 to receive emergency calls and call from close friends and family members. During other parts of the day, all calls would go through. This illustration is shown only as an example as to how the present invention may be used by a particular subscriber. Other times may be selected, and indeed, the service may be enabled for a full twenty four hours (at one level or at various levels of access). Also note that when a selected activation timer period has been selected (via the selection menu in FIG. 3B), this selection will temporarily override the preprogrammed time periods. Suitable voice messages may be generated to alert the subscriber if a conflict between preprogrammed time periods and a selected time occurs. Although not shown here, the present invention may be suitably modified to provide different programming periods for different days of the week or different groups of days (e.g., weekdays, weekends, or the like). Further, the subscriber may be given the option of programming selected dates or groups of dates, or may program particular months or weeks in advance. Alternately, the subscriber may program the system with a "default program" (e.g., for weekdays and weekends) which may be temporarily overridden with further suitable programming steps.

In the Time Period Menu of FIG. 3D, the subscriber must first select, in steps 341–343 whether he wishes to check or change pre-programmed times. Menu item (1) diverts processing to step 344, where a voice message announces the programmed time periods previously selected by the user (or default periods provided by the telephone service provider). This data may be provided in an access step (not shown) from ISCP 40. After programming, the selected times are listed at step 344 and the program returns to the main menu at step 352.

To set a preprogrammed time period, processing passes to step 345. In steps 345–350, the subscriber enters the start time, end time, and level of access for a desired program period. To confirm the subscriber's selection, processing is diverted at step 351 (if a STMF input between 1 and 4 has been carried out to step 344 to list the selected times. If no DTMF input has been made, step 351 diverts the process to step 349 for DTMF input. In the example shown here, the subscriber has elected three preprogrammed time periods with three different levels of access. However, it should be understood that a greater or lesser number of preprogrammed time periods may be used without departing from the spirit or scope of the invention. For the purposes of simplicity, and to limit memory requirements, a subscriber may be limited to a small number of preprogrammed time periods per day (e.g., five).

Figure 3E:
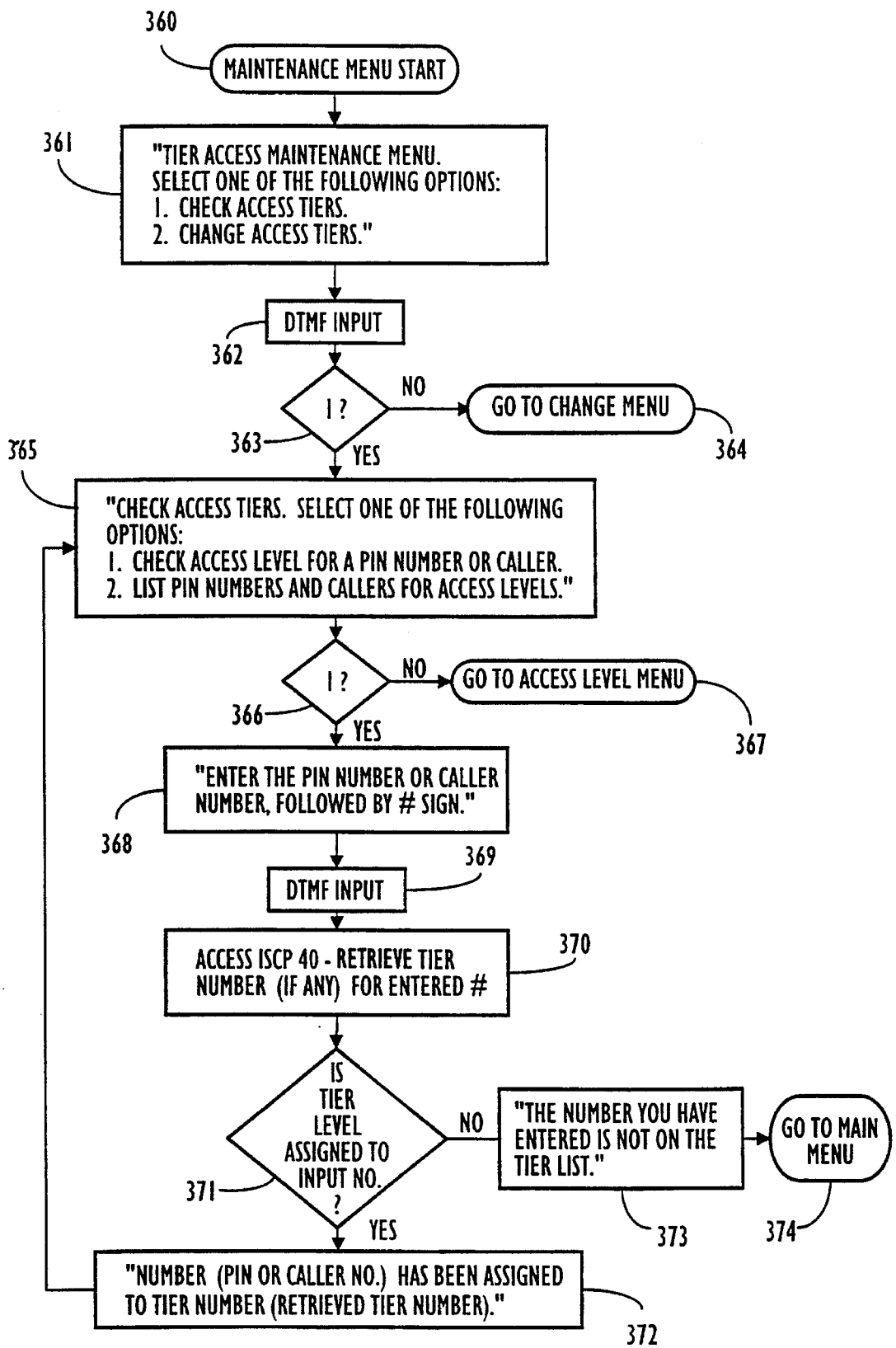
FIG. 3E is a flowchart of the fifth menu level for the user interface.

FIG. 3E shows menu level five, which starts at step 360, (main menu selection for maintaining tier level access lists. The menu of FIG. 3E is provided with two sub menus which are described below in connection with FIGS. 3F and 3G. At the prompt in step 361, the subscriber may select, in steps 362 and 363 whether to check or change access tiers. If the answer at step 363 is 'yes', Step 365 is the first level of the Check Access Tiers menu. For convenience of the subscriber, in step 365, the subscriber may either enter a caller or PIN and check that caller or PIN's access level, or may enter an access level and receive a list of all PIN and caller numbers for that access level. If the decision at step 363 is 'no', the program is diverted to the change menu at step 364.

If the former is chosen (indicated as 'yes' in selection step 366), processing passed to step 368 where the subscriber is prompted for a caller of PIN to check. This takes place after decision step 366 indicates 'yes'. If 'no' is indicated, the program is diverted to the access menu at step 367. After receiving the number in DTMF input step 369, the system accesses ISCP 40 for the tier level data in step 370. If no tier number is assigned to the caller or PIN, as determined in step 371, a prompt message is given at step 373 and processing passes to the main menu in step 374. Otherwise, the caller or PIN and associated tier level is announced to the subscriber at step 372, and processing passes back to step 365.

Figure 3F:
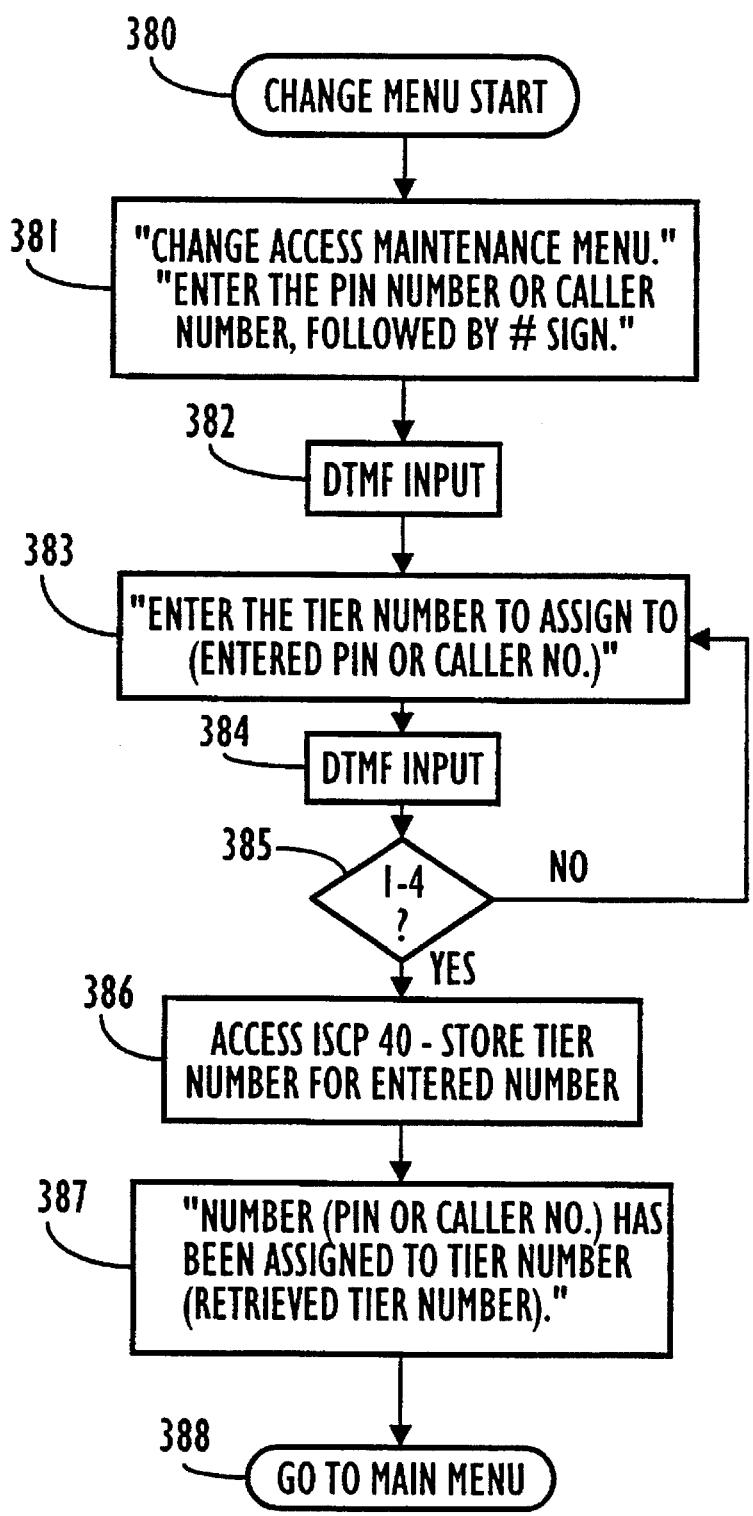
FIG. 3F is a flowchart of the sixth menu level for the user interface.
Figure 3G:
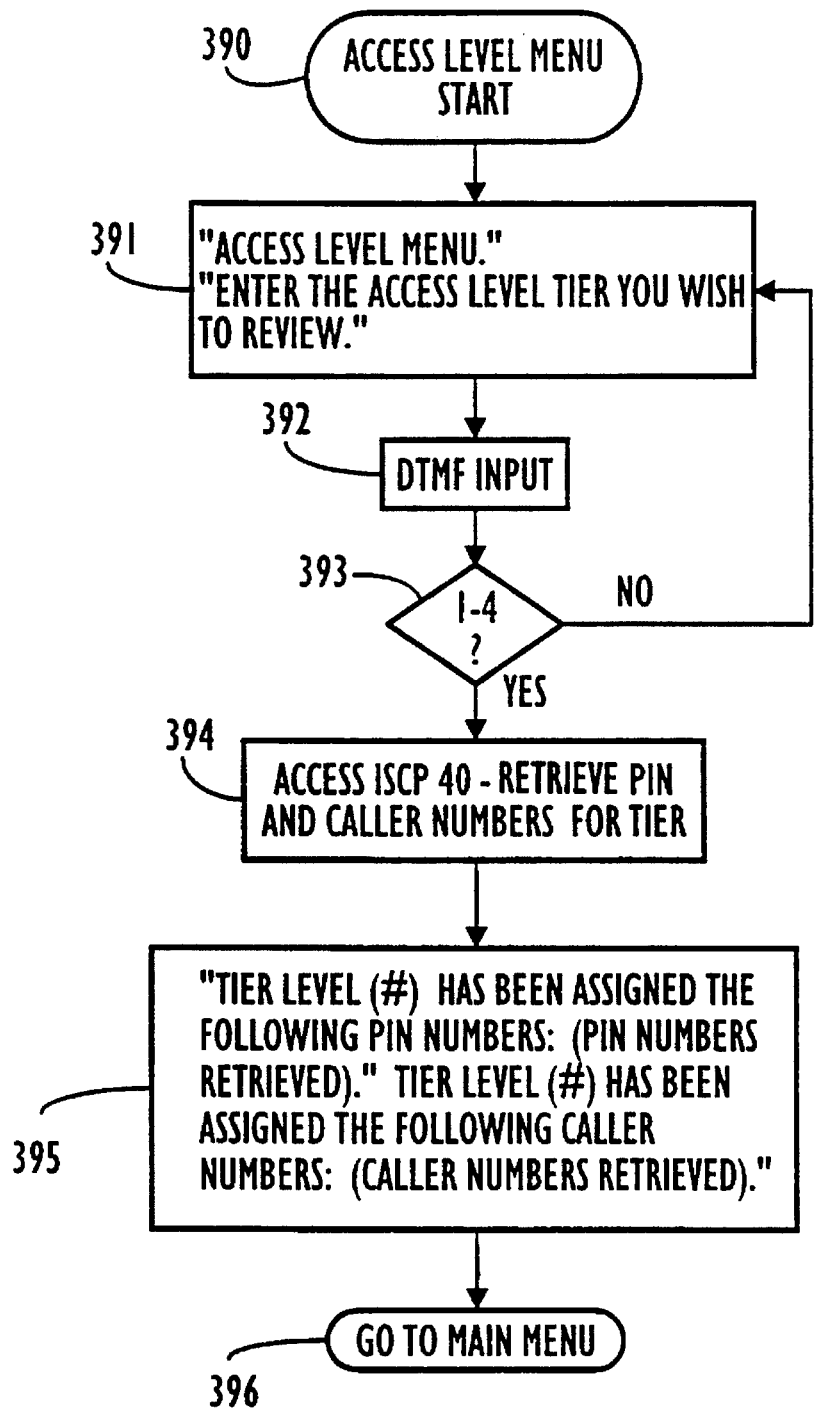
FIG. 3G is a flowchart of the seventh menu level for the user interface.

FIG. 3G shows the Access Level Menu accessed through step 367 in FIG. 3E and initiated at step 391. The subscriber may enter an tier level at DTMF input step 392 in response to the prompt at step 391. Step 393 may check to determine whether the tier level entered is a valid tier level. If valid, the system accesses ISCP 40 in step 394 to obtain a list of all caller and PINs for that tier level. In step 395, the system announces the list of PIN and caller numbers assigned to that tier level and returns processing to the main menu at step 396.

Note that not every tier may have assigned PIN or caller numbers. Further, for the sake of simplicity, emergency numbers from tier level 1 may not be announced. Similarly, if tier level four is selected to be all other numbers, then announcing numbers from this tier level may be superfluous and thus deleted.

FIG. 3F shows the sub-menu accessed from step 364 in FIG. 3E and initiated at step 380. The menu of FIG. 3F allows the subscriber to assign or reassign caller numbers or PIN to tier levels. After the prompt at step 381, the subscriber enters, via DTMF input step 382, a caller or PIN. After the prompt at step 383, the subscriber then enters the desired tier number via DTMF input step 384. A decision gate step 385 may be provided to determine whether a proper tier level has been entered. The system then accesses ISCP 40 at step 386 to store the entered number and tier number. In the preferred embodiment, the caller or PINs may be stored in groups by tier number as indicated at step 387, such that the system need only access that authorized tier when selective call blocking is enabled. A verbal prompt confirms the subscriber's selection and processing is returned to the main menu at step 388.

OPERATION

Figure 5:
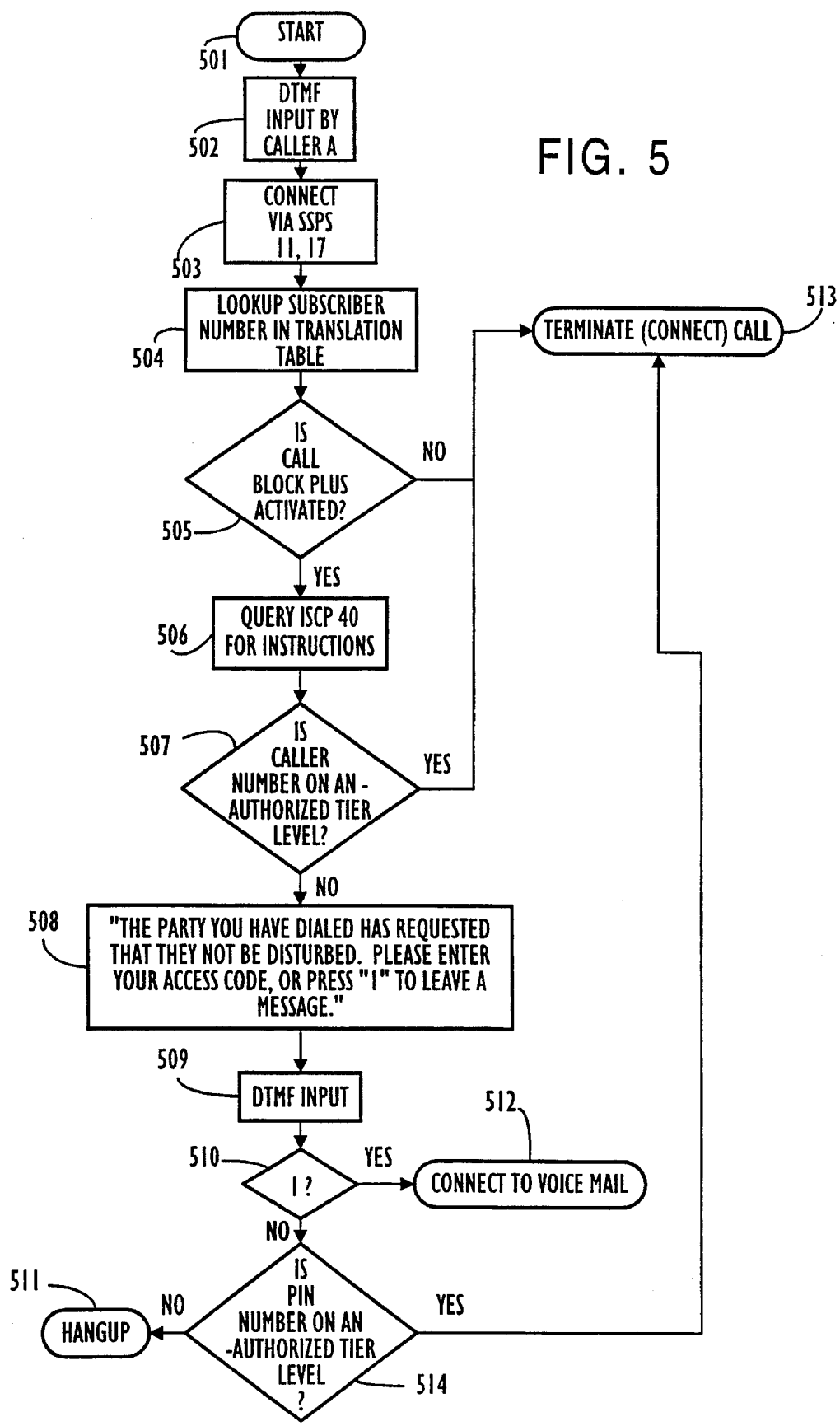
FIG. 5 is a flowchart of the process followed in selectively enabling a telephone call.

The operation of a standard call wherein party A is calling party D is described as follows in connection with FIGS. 1 and 5. Referring to FIG. 5, party D has activated selective call blocking, the parameters of which may be predefined in the ISCP 40. ISCP 40 has call processing records that function if selective call blocking service is activated. These call processing records are activated on a Terminating Attempt Trigger.

Referring to FIG. 5, the steps in the operation of selective call blocking are shown starting at start step 501. Caller A initiates a call to subscriber D by entering subscriber D's telephone number via DTMF input in step 502. Caller A is routed via SSP 11 to SSP 17, as shown in FIG. 1 and step 503. A Terminating Attempt Trigger (TAT) is generated in switch 17 such that when calls come during activation of the trigger, all calls hit switch 17 and switch 17 loads in a translation table against that number, as shown in step 504.

In step 505, switch 17 determines whether selective call blocking has been activated for subscriber D's number. If selective call blocking has not been activated, then the call is terminated (i.e., connected) to subscriber D's telephone in step 513. If selective call blocking has been activated by subscriber D, switch 17 acknowledges that it is a terminating attempt trigger and realizes that it does not know how to process the call. Switch 17 in turn formulates a TCAP message in step 506 that indicates caller A is attempting to call subscriber D and sends that information up to ISCP 40 to get further instructions on how to process that call.

The logic of how the call is to be processed is in ISCP 40. ISCP 40 will look into its own translation tables and determine what logic subscriber D has programmed as set forth in FIGS. 3A–3G. ISCP 40 may instruct switch 17 to route the call to voice mail, play a message or play announcements and/or terminate (i.e., connect) the call. ISCP 40 may also instruct switch 17 to indicate that the subscriber has activated selective call blocking and instruct caller D to call back at a later time.

From the caller A's AIN or Caller ID™ number, ISCP 40 may determine whether caller A's number is one of the numbers on an authorized tier level, as shown in step 507. If the number is authorized, the call is terminated (i.e., connected) to subscriber D in step 513.

If the caller number is not authorized, ISCP 40 may instruct SSP 17 to play an announcement and collect DTMF digits as shown in FIG. 508 and 509. If caller D enters a predetermined number (e.g., 1, followed by the # key) as indicated by a 'yes' decision at step 510, the call may be redirected to a voice mail system enabling caller D to leave a message to be carried out at step 512. If caller D enters a PIN on an authorized tier level, as determined in step 514, the call may be terminated (i.e., connected) as shown in step 513.

If the caller does not enter a valid PIN, the call will not be terminated (connected) to the subscriber. So that the caller is not offended by the access denial, a number of prerecorded "rings" may be played at step 511, followed by a recorded announcement such as "I'm sorry I'm not available right now, please leave a message . . . ". The call may then be connected to voice main as shown in step 512 or to another DTMF menu which may allow the caller to leave a message, hang up, or attempt to enter a PIN again. In this manner, the caller whose call is blocked may be led to believe that the subscriber is not home, and thus would not be offended by the subscriber's enabling of the selective call blocking.

Of course other options and messages may be used in the operation shown in FIG. 5. For example, so-called "fail safe" messages may be provided to prompt the caller is a number is incorrectly entered, allowing the caller to try again. In addition, other recorded messages may be used if other services are to be provided.

Another option is instead of playing announcements, or ringing or route to, a simple message which can be played stating that the subscriber is not available at this time. Various options can be provided such as press 1 to reach the subscriber on his car phone, or press 2 to go to voice mail.

INTELLIGENT PERIPHERAL

Figure 4:
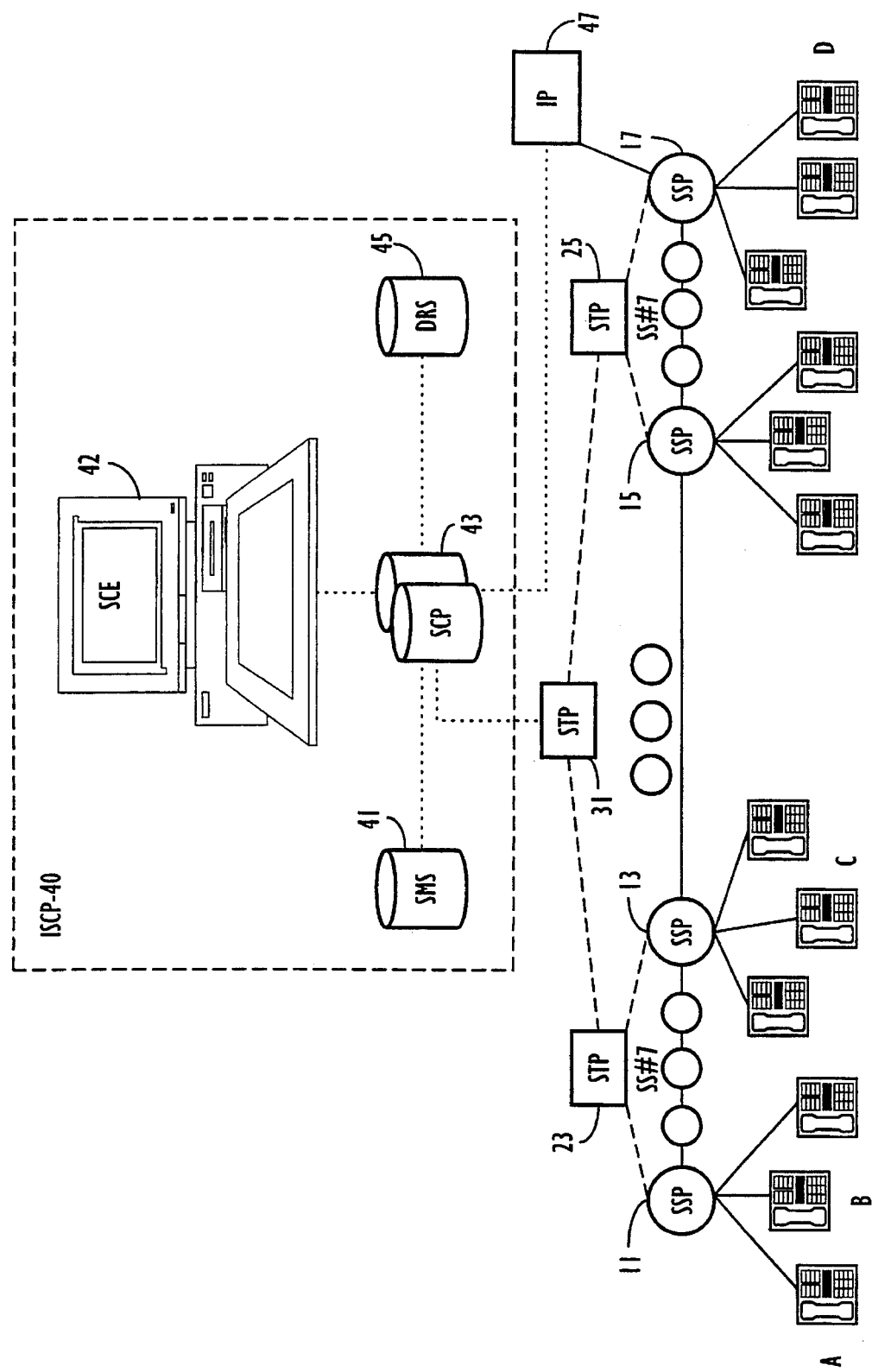
FIG. 4 is a block diagram of the preferred embodiment of the present invention.

FIG. 4 shows the preferred embodiment of the present invention using an intelligent peripheral (IP) 47. IP 47 may be used in place of, or to supplement ISCP 40. One IP 47 may be provided for each LATA or State calling area, or within other size regions. Although shown as connected to SSP 17 in FIG. 4, IP 47 may also be interfaced through STPs 23, 31, 25 or connected as a peripheral to ISCP 40. IP 47 may be connected to multiple switches within a telephone system via a T1 or ISDN Q.931 message interface, or may be connected to a trunk between switches. IP 47 may be connected to at least one switch 17 and connected, via Ethernet™ interface to ISCP 40. In the preferred embodiment, IP 47 is connected via an ISDN, such as the Bell Atlantic™ AIN, to ISCP 40. In the preferred embodiment, IP 47 comprises a UNIX™ based computer system, although other types of operating systems may be used.

IP 47 may be used to perform all or part of the functions described in programming the selective call blocking service described above in connection with FIGS. 3A–3G. By providing at least part of the programming feature within IP 47, the amount of data sent between switch 17 and ISCP 40 may be substantially reduced. For example, when programming the selective call blocking service of the present invention, as set forth in FIGS. 3A–3G, a substantial amount of time is required to successfully interface with the subscriber, provide the appropriate recorded messages, and collect DTMF input. In the preferred embodiment, IP 47 may perform these interface functions, and transmit data to and from ISCP 40 over the ISCP interface. In this manner, the burden on ISCP 40 is reduced.

IP 47 may be accessed by subscriber D by dialing a number which may be a virtual number in the telephone system. The subscriber may be prompted, as shown in FIGS. 3A–3G by IP 47 to input programming data for the selective call blocking service. This data may then be stored internally in IP 47 or sent to ISCP 40 and stored in SCP 43.

IP 47 may also be used to operate the selective call block service described above. For example, when an incoming call to party D is received and the TAT is invoked, the ISCP requests that the SSP 17 bridge to IP 47. Caller A is then connected to IP 47, which may place announcements and collect DTMF digits. IP 47 may then obtain additional information from ISCP 40 if necessary. For example, in the preferred embodiment, tier access lists and other data may be stored in ISCP 40 which is then accessed by IP 47. Thus, the intelligence may be provided in ISCP 40 with IP 47 acting only as a user interface or peripheral I/O device. Alternately, the intelligence may be shared between the two devices or provided exclusively within IP 47. The use of IP 47 eliminates the need for translation at SSP 17, as switch 17 need only connect the call to IP 47.

There are other advantages to providing IP 47 to provide some or all of the functions of ISCP 40. For example, voice mail functions may also be provided within IP 47, and thus, switching incoming calls to voice mail may be more easily and economically provided. Further, as use of the selective call blocking feature expands, additional IPs 47 may be added to the system with minimum cost to expand the capacity of the system. Further, new ancillary features may be provided in IP 47 by the telephone service provider without the need to reprogram SSPs 11, 13, 15, 17 or ISCP 40. For example, it is envisioned that IP 47 may be used to provide voice recognition as an alternative to DTMF entry. IP 47 may be programmed to accept voice inputs to step through the menus of FIGS. 3A–3G (suitably modified for voice entry) or to provide voice recognition to determine the routing of an incoming call.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

For example, although the voice messages shown in FIGS. 3A–3G and FIG. 5 are shown as standardized messages, the system may be provided such that the subscriber may record his own, custom messages, to be played back in his own voice. Further, dial pulse (DP) input may be used in place of the DTMF input shown in the present invention.

We claim:

1. In a communications system comprising local communication lines, an integrated services control point comprising a data base for storing call processing data, a service management system connected to said data base and a data and reporting system for performing processing on said data base, a plurality of interconnected central office switching systems each connecting to a plurality of said local communication lines and responding to a service request on a connected local communication line to selectively provide a communication connection between a requesting line and another local communication line, and a signalling communication system interconnecting the central office switching systems and connecting the central office switching systems to the integrated services control point, a method of providing selective call blocking comprising the steps of:

outputting a Transaction Capabilities Applications Protocol (TCAP) query message from one of said central office switching systems in response to a request for services from a subscriber via one of said communication lines and in accordance with a translation table stored in said one central office switching system corresponding to said subscriber;

supplying at least a first part of said call processing data corresponding to said subscriber from said integrated services control point to said one central office switching system in response to said TCAP query message;

initiating an interface session with said subscriber in accordance with said first part of said call processing data;

supplying for said data base a list of caller numbers authorized to have access to said subscriber, and dividing said list of caller numbers into a plurality of groups during said interface session, each group being on a different authorization tier wherein each authorization tier has different requirements for bypassing a call blocking feature set for incoming calls to said subscriber;

supplying for said data base, during said interface session, time period data for activating a selective call blocking service;

storing said list of caller numbers and said time period data obtained during said interface session in said data base as a second part of said call processing data for said corresponding subscriber;

activating the selective call blocking service in accordance with said time period data stored in said data base, said activating step comprising the steps of:

outputting an activation signal from said integrated services control point to said one central office switching system for said time period stored in said data base, and updating said translation table corresponding to said subscriber stored in said one central office switching system in response to said activation signal; and selectively enabling access to said subscriber to callers having caller numbers stored in said data base in accordance with said updated translation table and said list of caller numbers.

2. A method as recited in claim 1, wherein said storing step comprises the step of updating a preexisting list of caller numbers in said plurality of groups for said subscriber in response to said interface session.

3. A method as recited in claim 1, wherein said selectively enabling step comprises the steps of:

outputting from said one central office switching system a second TCAP query message, in response to a service request from a second central office switching system having a caller on said requesting line, to said integrated services control point in accordance with said updated translation table;

outputting from said integrated services control point a routing signal to said one central office switching system in response to said TCAP query message and in accordance with said second part of said call processing data of said subscriber; and causing said one central office switching system to terminate said caller on said requesting line to one of said subscriber and a voice mail system in response to said routing signal.

4. A method as recited in claim 1, wherein:

said communications system further comprises an intelligent processor in communication with said integrated services control point and adapted to communicate with at least one of the central office switching systems of the connected central office switching system;

said intelligent processor supplies said corresponding first part of call processing data from said integrated services control point to said one central office switching system in response to said TCAP query message;

said intelligent processor performs said initiating step;

said intelligent processor performs said list supplying step and said time period data supplying step by capturing during said session said list of caller numbers and corresponding authorization and said time period data in response to subscriber inputs;

said storing step comprising the step of uploading from said intelligent processor said captured list, authorization and time period to said integrated services control point.

5. A system for providing a call blocking feature in a telecommunications system, comprising:

a plurality of interconnected central office switching systems, wherein each of said central office switching systems connects to a plurality of local communication lines, each responding to a service request on a connected local communication line to selectively provide a communication connection between a requesting line and another local communication line;

an integrated services control point, separate from the central office switching systems, said integrated services control point comprising:

(i) a database for storing call processing data associated with at least one of the local communication lines connected to each of at least two of the central office switching systems, said call processing data adapted to include a plurality of caller numbers corresponding to a subscriber of said call blocking feature, said plurality of caller numbers being divided into a plurality of groups, each group being allocated a different authorization tier wherein each authorization tier has different requirements for bypassing said call blocking feature;

(ii) a service management system connected to said database, and (iii) a data and reporting system for performing processing on said database;

a signalling communication system for two-way communications of data messages, said signalling communication system interconnecting the central office switching systems and connecting the central office switching systems to the integrated services control point;

wherein:

in response to a request for service from one of the local communication lines by said subscriber, the one central office switching system connected to that one line initiates access to the database in the integrated services control point to obtain call processing data associated with said subscriber; and in response to a password supplied by said subscriber and in accordance with said call processing data, the integrated services control point stores a plurality of caller numbers and corresponding authorization in response to inputs from said subscriber to enable said call blocking feature for said subscriber.

6. A system as recited in claim 5, wherein said subscriber supplies said password and inputs in response to voice prompts generated in accordance with said call processing data.

7. A system as recited in claim 5, wherein said integrated services control point establishes said call blocking feature as a new service in response to said inputs from said subscriber.

8. A system as recited in claim 5, wherein said integrated services control point updates a preexisting translation table for said subscriber in response to said inputs from said subscriber.

9. A system as recited in claim 8, wherein said preexisting translation table comprises an existing plurality of said caller numbers, said integrated services control point updating said preexisting table with said plurality of caller numbers and corresponding authorization in response to said subscriber inputs.

10. A system as recited in claim 5, wherein said database further comprises time limits input by said subscriber indicating activation intervals for said authorization tiers, respectively.

11. A system as recited in claim 10, wherein:

said integrated services control point outputs an activation signal to said one central office switching system corresponding to said subscriber in accordance with said activation intervals, said one central office switching system storing a translation table, in accordance with said activation signal, identifying said subscriber as enabling said call blocking feature;

in response to a service request from a second central office switching system having a caller on said requesting line, said one central office switching system outputs a transaction capabilities applications protocol ( TCAP ) query message to said integrated services control point in accordance with said stored translation table;

said integrated services control point outputs a routing signal to said one central office switching system in response to said TCAP query message and in accordance with said caller numbers and corresponding authorization stored for said subscriber; and said one central office switching system terminates said caller on said requesting line in response to said routing signal.

12. A system as recited in claim 11, wherein said caller numbers and corresponding authorization stored for said subscriber identify said caller as an authorized caller, said one central office switching system terminating a connection between said caller and said subscriber in response to a DTMF password input from said caller.

13. A system as recited in claim 11, wherein said caller numbers and corresponding authorization stored for said subscriber identify said caller as an unauthorized caller, said one central office switching system terminating a connection between said caller and a voice mail system.

14. A system as recited in claim 5, further comprising an intelligent processor in communication with said integrated services control point and adapted to communicate with at least one of the central office switching systems of the connected central office switching system, said intelligent processor initiating an interface session with said subscriber and supplying said corresponding call processing data to said one central office switching system in response to said request for service by said subscriber, said intelligent processor capturing said plurality of caller numbers and corresponding authorization and a plurality of activation intervals for said authorization tiers, respectively, in response to said inputs and uploading said captured caller numbers and corresponding authorization to said integrated services control point after completion of said interface session.

15. A system as recited in claim 14, wherein:

said one central office switching system stores a translation table, in accordance with said activation intervals, identifying said subscriber as enabling said call blocking feature;

in response to a service request from a second central office switching system having a caller on said requesting line, said one central office switching system outputs a transaction capabilities applications protocol (TCAP) query message to said integrated services control point in accordance with said stored translation table;

said integrated services control point outputs a routing signal to said one central office switching system in response to said TCAP query message, said one central office switching system terminating said caller to said intelligent peripheral in response thereto; and said intelligent peripheral terminates said caller on said requesting line in accordance with said caller numbers and corresponding authorization stored for said subscriber.

* * * * *